Figure 1:
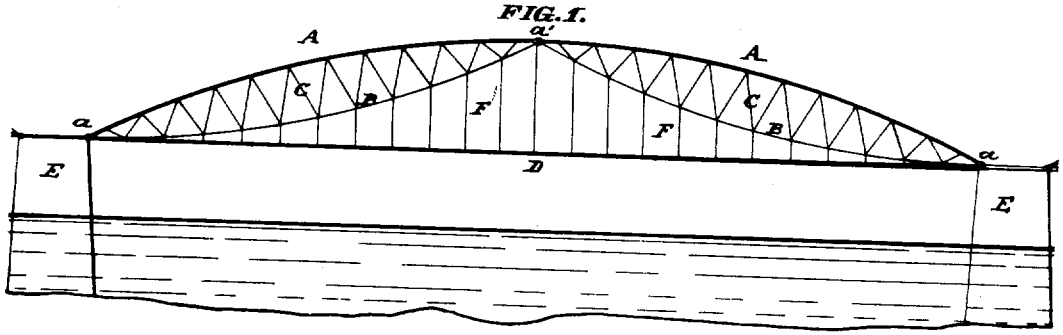

14. BRIDGES,

25 Arch, Compound.

BEST AVAILABLE COPY

DRAWING

J. B. EADS.

Iron-Bridge.

No. 6,444.

Reissued May 25, 1875.

ATTEST:

[redacted]

Burns.
Tanner

INVENTOR:
James B. Eads
By Knight Bro.
Attys.

THE GRAPHIC CO. PHOTO-LITH. 39 & 41 PARK PLACE, N.Y.

UNITED STATES PATENT OFFICE.

JAMES B. EADS, OF ST. LOUIS, MISSOURI.

IMPROVEMENT IN IRON BRIDGES.

Specification forming part of Letters Patent No. 142,381, dated September 2, 1873; reissue No. 6,444, dated May 25, 1875; application filed May 10, 1875.

DIVISION A.

*To all whom it may concern:*

Be it known that I, JAMES B. EADS, of St. Louis, St. Louis county, State of Missouri, have invented an Improvement in Bridges, of which the following is a specification:

This improvement relates to a bridge whose spans are provided with central joints.

My invention consists in stiffening or trussing the arches which constitute each half of the bridge by locating the bracing below the arches. This I do by attaching longitudinal members to the ends of the arches below them, and joining these members to the arches above them by suitable interposed bracing, each arched rib of the half-span being thus braced against distortion by its own individual system of bracing beneath it.

If half the span of an upright arch be loaded, a horizontal impulse is given to the arch at the crown, tending to move its center point toward the unloaded half. To prevent this horizontal movement of the center of the arch is a desideratum of the utmost importance, and as the deflection of the loaded half depends almost wholly on the horizontal movement of the central point, it will be evident that any system of bracing which, while tending to stiffen the arch, increases the impulse of a partial load to move its center in the direction of the unloaded half-span, must be in conflict with economy. This objectionable feature is found where the arch constituting the half-span is stiffened by any one of the known systems of bracing placed above it, as in spandrel bracing, or the bracing of the ribs of the jointed-arch bridge at Szegidin, in Europe. When the bracing is above the arch, the load produces in the loaded half compressive strains in the upper longitudinal member of the bracing, and these strains are transmitted by the braces at the ends of the longitudinal member to the center of the arch, and consequently tend to increase the horizontal movement of that part of the arch toward the unloaded side; hence resistance to the strains, when the arch is thus braced, must be had by increase of material in the arch itself and in the bracing.

If the longitudinal members and bracing referred to be placed beneath (instead of over) each of the arches which constitute each half-span, as in the present improvement, these objections vanish, because the strains in the longitudinal members of the bracing are then reversed, and great economy of material is secured. Under the loaded half they become tensile strains in the longitudinal member, and it therefore resists the horizontal movement of the central joint by pulling directly against it, which tends to prevent the spread or flattening of that half, and under the unloaded half they are compressive strains in the longitudinal member, and push against the joint, and this lessens the compressive strain in the unloaded half-arch, while the intermediate bracing prevents the distortion of the arch and its longitudinal member; hence, if bracing be thus placed below the arched members of each half-span, the horizontal movement of the central joint is prevented, and we have the most economical solution of the problem of bracing arched spans to resist the effect of unequal loading which it is possible to accomplish. We consequently have the most economical system of superstructure for roofs and bridges that is possible.

Figure 2:
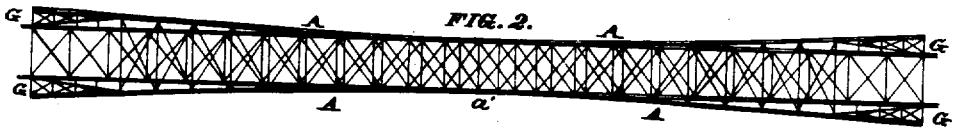
Figure 5:
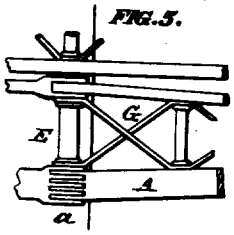
Figure 3:
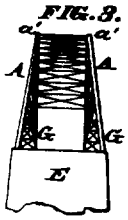
Figure 6:
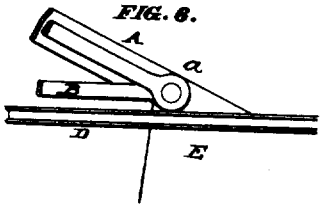
Figure 4:
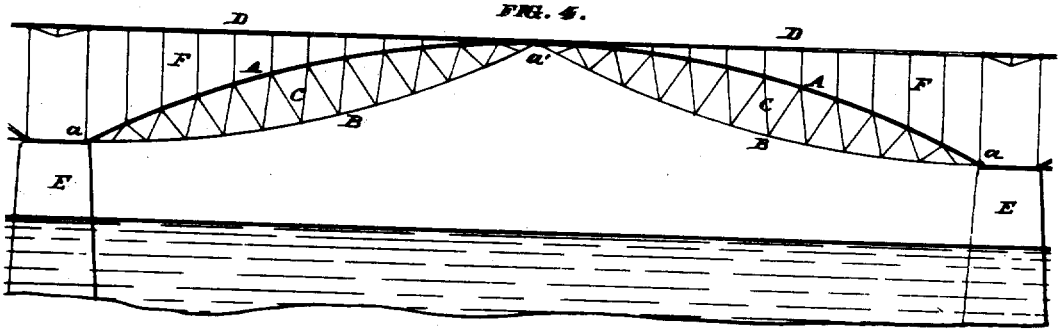

In the drawings, Figure 1 is a side view of the bridge. Fig. 2 is a top view. Fig. 3 is an end view. The above figures all show a "through-bridge." Fig. 4 is a side view of a "deck-bridge." Fig. 5 is a top view, showing a portion of the end of the arch and roadway. Fig. 6 is a longitudinal section, showing the end of an arch and part of roadway. Figs. 5 and 6 are drawn to an enlarged scale relatively to the preceding figures.

A A is an upright arch, formed of two independent arches of half the span, which may be connected to the abutments by hinged joints *a a*, and which has a hinged joint, *a'*, at its crown, to prevent strains occurring in the middle of the span in consequence of its rising and falling at that point when extended or contracted by changes of temperature. B B are inverted arches or longitudinal members, connected firmly to the arches A A at their ends, and connected between their ends to the arches by any suitable brace-work, C, which may be lattice, double or single triangular, or any other system deemed most judicious. The two half arches A A, with their two counter-arches or longitudinal members, constitute one rib of the bridge. There should be in one span of the bridge two or more of these ribs, according to strength and width required.

When a partial load is on one end of the span, as designed in Figs. 1 and 4, the counter-arch under the loaded end is strained by tension, as the weight is transmitted to it by the vertical bracings between the main and counter arches upon that side. The counter-arch at the unloaded end is at this time under compression, and forms, with the unloaded half of the main arch, an inclined strut between the center of the span and the abutment, which transmits the pressure caused by the load to the abutment at the unloaded end.

The unloaded counter-arch in Figs. 1 and 4, by its compressive strength and vertical attachment to the unloaded half of the main arch, resists a part of the compressive strain upon the arch, and prevents that part of it from rising up and losing its proper curvature.

The appearance of the span in Fig. 1 bears much resemblance to the bow-string girder; but it is essentially different, as the thrust of the arch has no chord to resist it. The roadway D in this figure gives the appearance of a chord, and causes this resemblance. In the bow-string-girder form of bridge the string or chord would require to have almost the same section as the arch.

The roadway D in Fig. 1 is not attached to the abutment E, but, if made of metal, is free to slide thereon, as its length is increased or diminished by change of temperature. The roadway D may assist in the support of the arches, if it is desirable to dispense with the abutments and use the roadway as chords for the bow-string girder. In Fig. 1 the roadway is connected with the arches only by vertical suspension-rods F, as shown in Fig. 4, by struts F.

When arranged as a deck-bridge, as in Fig. 4, the roadway should be directly attached to the center joint $a'$ of the span, or to each arch near the center, so as to insure its equal extension and contraction at each end of the span. If the roadway is placed above and secured at the central joint $a'$, its expansion and contraction will be easily accommodated by the slight alteration in the vertical position of the struts F, as it will expand and contract in each direction from that joint, and this will be accommodated by its capacity of longitudinal movement on the abutment.

If the roadway be suspended below, as in Fig. 1, the suspension-rods F will adjust themselves readily to these alterations in the length of the roadway, except at each end of the span, where they may be too short, and where the movement of the roadway, caused by changes of temperature, will be most excessive. At these points the suspenders should be arranged in stirrup form, to allow the roadway to slide back and forth through them. Although this movement will, even in long spans, be only the fraction of an inch, or at most a few inches, it is important to accommodate it in the way suggested, or in the manner that trusses are allowed to move longitudinally on the top of bridge-piers, so as to avoid all strains from temperature in the superstructure, as well as to avoid the horizontal force that would otherwise exert itself to overturn the piers or abutments, and which force, if not thus accommodated, will require the piers and abutments to be so much stronger. If the longitudinal parts of the roadway are made of timber, these provisions for expansion will be needless. Any suitable system of lateral bracing may be used between the arches, to preserve the relative position of the arches in their proper planes, and to resist wind-pressure. The roadway should also be provided with wind-bracing. When the roadway is suspended, of course a portion of the wind-bracing between the arches must be omitted at each end of the span for head-room, unless the road be suspended some distance below. The widening of the ribs at the abutments will allow of the introduction of inside stays from the abutment to the points of the upright ribs of the arch, where the wind-bracing commences. This is shown at G in Figs. 2, 3, and 5. Vertical stiffeners may also extend up from the roadway-beams to the arches, where the bracing is omitted, (for headway.) With the roadway above, (see Fig. 4,) the stays G would be unnecessary, as the wind bracing between the ribs may be continuous from end to end. The object of these stays is to preserve the arches in their proper planes where the necessity of head-room for the suspended roadway makes it necessary to omit the bracing between the arches at each end of the span. The counter-arches, as shown in Figs. 1 and 4, required in a span of five hundred feet, to carry two thousand five hundred pounds per foot, are found, by careful investigation, to need but two-elevenths of the section of the supporting-arches; hence the weight of the arches and counter-arches of this system would be to the arches and chords of a bow-string girder of equal versed sine and strength as thirteen to twenty-two, while the vertical bracing in this system would also be less than in the bow-string girder. If compared with the bow-string girder, as ordinarily stiffened, the difference between it and the arch thus braced would be much greater. The value of my invention is shown by this comparison, the estimate having been made for steel arches with one-eighth versed sine. Twenty thousand pounds per square inch was the maximum strain allowed, and compression-members twelve diameters in length. It is applicable, with great economy, to the bow-string girder, in which form the central joint will be needless. In constructing the arches the greatest economy will be attained by making all the members straight between the points of attachment of the vertical bracing. I would recommend that the longitudinal members or counter-arches be of similar curvature to the main arch. The straighter they are the greater will be the strain upon them. By the increased curvature of these members the strains in them will be reduced, but the lengths of the vertical bracing will be increased. The longitudinal members should, of course, be formed to resist compression as well as tension. Each arch of the half-span may be of any desired curvature.

I claim as my invention—

1. The combination of two arches joined together end to end, so that each constitutes one-half of a single span or complete rib of a roof or bridge, when each of said arches is combined with a system of bracing under or on the concave side of the arch.

2. The bracing C C, when used beneath an arch jointed at the center, and to the abutments, in combination with the longitudinal members B B, for the purpose set forth.

3. The longitudinal member or counter-arch B, when combined with the half-span arch A and bracing C, constituting one-half of a jointed arch or rib of a bridge, for the purpose set forth.

JAS. B. EADS.

Witnesses:
SAML. KNIGHT,
R. S. ELLIOTT.